Jan. 26, 1971  J. G. BRYANT  3,559,048
SHIELDED IN-LINE ELECTRICAL MEASURING CELL
Filed Nov. 7, 1967  2 Sheets-Sheet 1

INVENTOR
JAMES G. BRYANT
BY *William H. Duffey*
ATTORNEY

United States Patent Office 3,559,048
Patented Jan. 26, 1971

3,559,048
SHIELDED IN-LINE ELECTRICAL MEASURING CELL
James G. Bryant, Anniston, Ala., assignor to Monsanto Company, St. Louis, Mo., a corporation of Delaware
Filed Nov. 7, 1967, Ser. No. 681,211
Int. Cl. G01r 27/02
U.S. Cl. 324—30                                       4 Claims

ABSTRACT OF THE DISCLOSURE

An in-line electrical measuring cell comprising two concentrically disposed shielded electrodes adapted to permit measurement of the electrical properties of a fluid flowing through the annular clearance between the shielded electrodes, and a method of using the cell.

---

Figure 1:
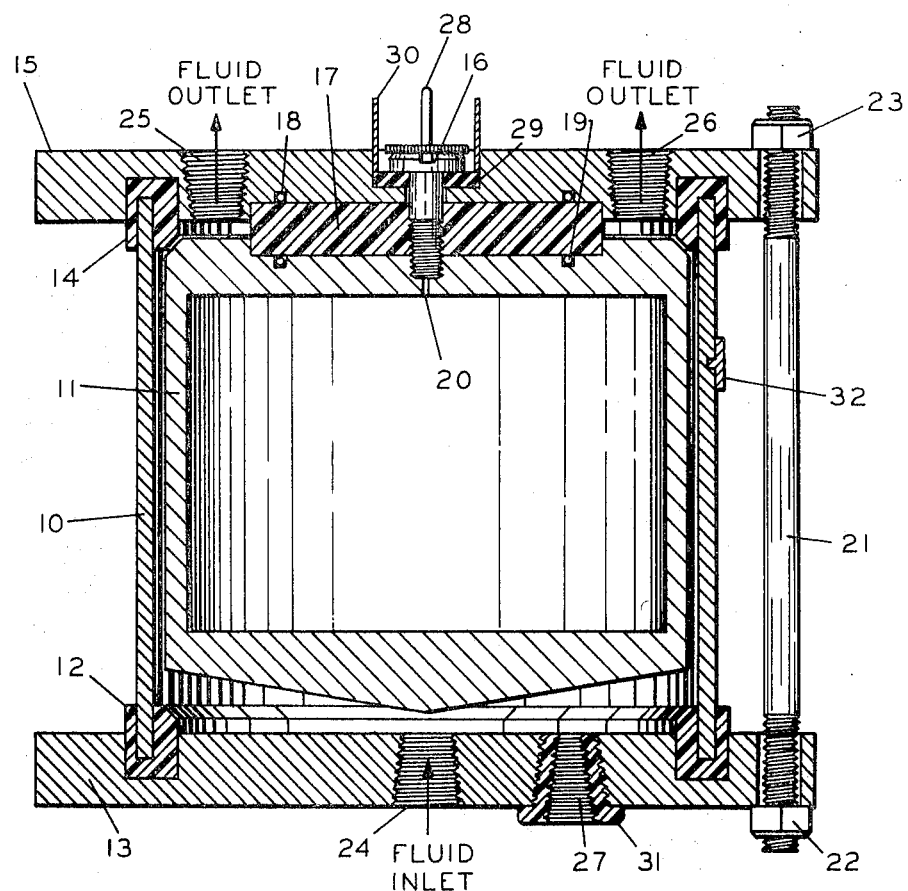

This invention relates to the means and method for in-line measurement of the electrical properties of fluids. More specifically, it relates to an in-line measuring cell for continuous monitoring of the electrical properties of a fluid flowing in a process stream or the like.

Resistivity, dissipation factor, phase angle, capacitance, dielectric constant and power factor are the parameters most frequently recorded in determining the electrical quality of a dielectric fluid. Chlorinated biphenyl is one example of a dielectric fluid having outstanding properties for use in electrical devices such as capacitors and transformers. The teachings of this invention, however, are not limited to chlorinated biphenyl.

The purity of a dielectric fluid has a profound effect on each of its electrical properties. In the production of a fluid such as chlorinated biphenyl for electrical use, therefore, extreme care must be taken to attain the required degree of refinement and to minimize impurities.

Special test instruments are customarily employed to periodically check the electrical properties of a dielectric fluid during and after processing. Among the instruments known to the art is the concentric electrode cell. This cell usually contains two electrodes concentrically disposed with respect to each other wherein the radial spacing between the electrodes is fixed by a glass spacer plate. By applying voltage across the two electrodes, the electrical properties of a fluid disposed therebetween can be measured by means of a suitable bridge or the like. The most familiar embodiment of the concentric electrode cell is a beaker-type cell wherein a sample of the fluid to be tested is drawn from the process stream, or other source, and thereupon transferred to the laboratory for evaluation in the beaker. Heating means are provided for controlling the temperature of the fluid sample within the beaker.

Exposure of the fluid sample to light, atmosphere, extreme heat, contamination and stray electrical interference are some of the many factors which make the beaker cell measurements less representative and less accurate than measurements taken within the process stream. Because of the sensitivity of the electrical measurements, however, it has heretofore been difficult, if not impossible, to successfully adapt the concentric electrode cell to a fluid conduit such as a process stream. Fluid turbulence, fluid aeration and other discontinuities and disturbances tend to cause erratic electrical readings with test devices known to the art. Stray electrical interferences have also caused erratic readings with known test devices.

Thus, prior to the outstanding contribution of the present invention, there existed a need for a measuring cell capable of providing accurate electrical readings under dynamic conditions such as those prevailing in a process stream. It is an object of the present invention, therefore, to provide an in-line cell capable of evaluating the electrical properties of a dielectric fluid under dynamic conditions. Another object of the present invention is to provide the means and method for obtaining repeatable and accurate electrical readings of a flowing dielectric fluid, e.g., such readings as resistivity, power factor, phase angle, capacitance and dielectric constant. Still another object of the present invention is to provide a guarded in-line cell which is not susceptible to erroneous readings and stray electrical interference signals. Yet another object of the present invention is to provide an in-line measuring cell especially adapted for use in a process stream. Still another object of this invention is to provide a measuring cell assembly having outstanding flow characteristics. Other objects and aspects of the present invention will become apparent from a consideration of the accompanying disclosure and drawing, and from the appended claims.

Figure 2:
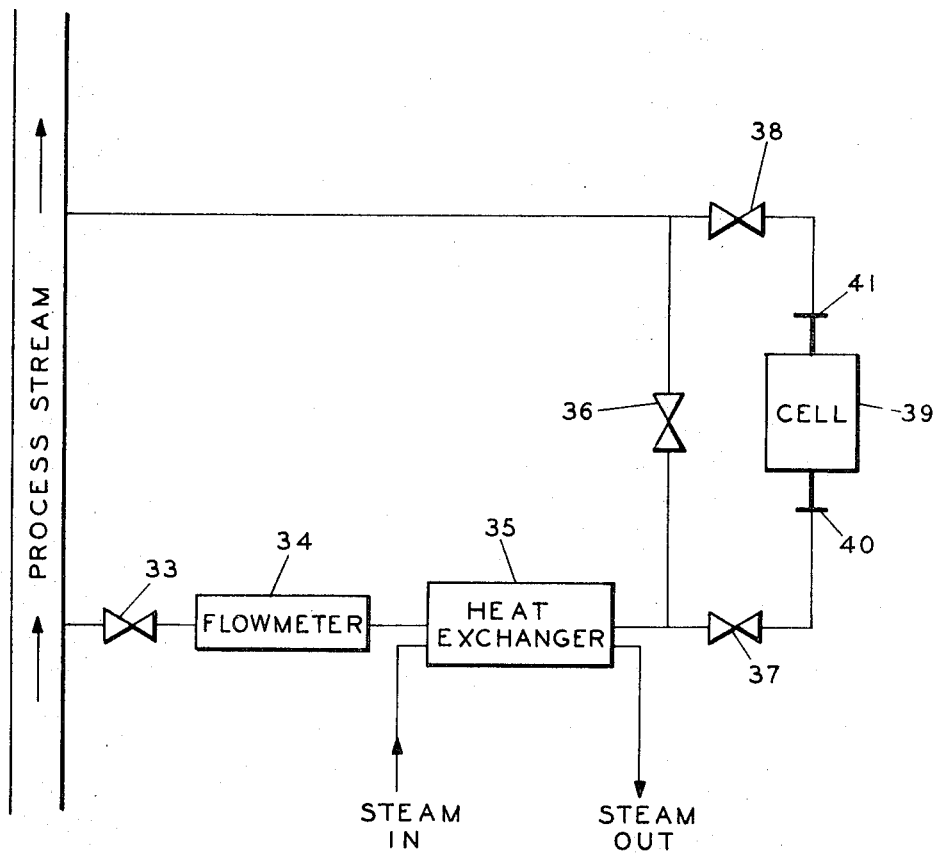

In the drawing:
FIG. 1 is a fully sectioned elevation view of the in-line measuring cell disclosed by the present invention.
FIG. 2 is a schematic diagram of a flow system incorporating the in-line measuring cell of the present invention.

Referring now to FIG. 1 of the drawing, the outer electrode of the cell is indicated by reference numeral 10. This is the negative or low electrode. In the preferred embodiment, although not to be considered a limitation, outer electrode 10 has a cylindrical shape. Inner electrode 11, which is the positive or high electrode, is disposed within outer electrode 10 and is concentrically positioned with respect thereto. Inner electrode 11 has a circular cross-section preferably with a hollow center portion for weight reduction. The conical surface on the bottom of inner electrode 11 is influential in creating the flow characteristics necessary for good electrical readings. A preferred material for the electrodes is stainless steel.

With continued reference to FIG. 1 of the drawing, outer electrode 10 has affixed to its lower end annular insulating spacer 12. Spacer 12 engages a circular recess in lower guard flange 13. Guard flange 13 serves two purposes herein, viz., as a main structural member of the cell and as part of the guard or shielding electrode. Affixed to the upper end of outer electrode 10 is insulating spacer 14 which engages a circular recess in upper guard flange 15. Spacers 12 and 14, which are made, for example, from a tetrafluoroethylene polymer, also serve as fluid seals to prevent escape of the dielectric fluid being tested as well as electrical insulators for the electrical measurements.

Again referring to FIG. 1, it will be seen that inner electrode 11 is positioned by means of adjusting screw 16 which passes through a hole in upper guard flange 15. Electrical isolation of inner electrode 11 from guard flange 15 is afforded by spacer 17 which is fabricated from insulating material, preferably a tetrafluoroethylene polymer. In the illustrated embodiment, spacer 17 is shaped as a disc. To prevent leakage of the test fluid around adjusting screw 16, O-ring seals 18 and 19 are disposed in contiguity with spacer 17. These seals engage grooves in guard flange 15 and inner electrode 11, respectively. Vent hole 20 in the upper wall of inner electrode 11 serves as a vent for the hollow center.

With continued reference to FIG. 1 of the drawing, it will be seen that the in-line cell assembly is held together by through-bolts, illustrated typically at reference numeral 21. Three bolts spaced at 120 degree intervals have proven adequate. Through-bolts 21 pass through holes in guard flanges 13 and 15 and are adjusted to the correct tension by means of nuts 22 and 23. Through-bolts 21 serve as an electrical connection between the guard flanges as well as providing physical support for the cell. These bolts must be fabricated from an electrical conducting material such as stainless steel. Dielectric fluid is introduced to the cell assembly through threaded port 24 in lower guard flange 13 and discharges through ports 25 and 26 in upper guard flange 15. More than two outlet ports may be employed. Threaded hole 27 in lower guard flange 13 is adapted to receive temperature indicating means such as a thermocouple. Insulating bushing 31 provides insulation of the thermocouple sheath from guard flange 13.

The electrical connections to the in-line cell of FIG. 1 are of the three-terminal type, i.e., a high or positive terminal, a high or positive guard terminal, and a low or negative terminal. The high or positive terminal is indicated by reference numeral 28, this terminal being inserted into the head of adjusting screw 16, but removable to permit screw adjustments. Under the head of adjusting screw 16 is insulating washer 29. Adjacent to insulating washer 29 is guard terminal 30 which is affixed to guard flange 15. This high or positive connection is electrically guarded all the way from inner electrode 11 to the measuring bridge. This guard connection is made between the cable shield and guard terminal 30. The low or negative electrical connection is made at terminal 32 using an insulated non-shielded conducting wire. Terminal 32 is securely affixed to outer electrode 10. It is important that the wire to terminal 32 be non-shielded.

Referring now to FIG. 2 of the drawing, a schematic diagram of a typical flow system incorporating the in-line measuring cell of the present invention is illustrated. Process stream flow is diverted through flow control valve 33 and the rate of flow is measured by flowmeter 34. The fluid to be tested is then directed through heat exchanger 35 wherein the desired temperature is attained by controlling the quantity of steam admitted to the heat exchanger. When it is desired to measure the electrical properties of the fluid, bypass valve 36 is closed. Cell shutoff valves 37 and 38 are opened and the fluid is admitted to the power factor cell, the cell being identified by reference numeral 39. The flow through the cell thereupon becomes continuous. Electrical breaks are provided near the inlet and outlet of cell 39 to screen stray electrical signals from the cell electrodes. Breaks 40 and 41 comprise a non-metallic section of tubing, the preferable material being a tetrafluoroethylene polymer. Additionally, cell 39 is housed in a conducting metal case grounded to the same potential as the test bridge itself. This ground does not have to be at a different potential from instrument negative or low potential, but for three-terminal measurements this is desirable. The cell, of course, is completely insulated from the grounded metal case.

By referring again to FIG. 1 of the drawing, the physical characteristics of the in-line cell can be understood. There are certain critical features of this cell which account for its accurate performance under dynamic flow conditions. For example, it has been found that central inlet port 24 is adapted to produce advantageous flow patterns in cooperation with the conical lower surface of inner electrode 11. As the flow passes through inlet port 24 it is divided uniformly. As the fluid proceeds toward the radial clearance between the inner and outer electrodes, a reduction in fluid velocity occurs. This reduction in velocity is caused by the diverging nozzle effect created by the lower conical surface of inner electrode 11. This velocity reduction, which is attributable to an area increase, promotes uniformity of flow as the dielectric fluid enters the radial clearance between the two electrodes, i.e., the measuring zone. To further insure uniformity of flow, the clearance between inner electrode 11 and insulating spacer 14 is partially restricted to create a nominal back presure with a resultant filling effect in the measuring zone. Unless such uniform flow is achieved, there will be a deleterious effect on the accuracy and repeatability of the electrical readings. The multiple outlet ports, with their symmetrical location, have also proven advantageous in promoting efficient flow conditions through the cell embodiment illustrated herein. The conical lower face of inner electrode 11 provides for quick measuring response with a small volume of fluid sample and also promotes constant flow across the measuring tip of the thermocouple in hole 27. Furthermore, the conical face eliminates erroneous measurements caused by trapping of air under the electrode, a problem to which the open-ended hollow electrodes of the prior art are susceptible.

Some variation can be permitted in dimensioning the radial gap in the measuring zone between the two electrodes. With a nominal cell diameter of 4 inches, it has been found that a radial gap of approximately $\frac{1}{10}$ of an inch is satisfactory. The length-to-diameter ratio of the electrodes is also capable of variation. It has been found that a nominal 1:1 ratio is acceptable. Good electrical measurements have been obtained with a cell having a nominal electrode diameter of 3¾ inches under a flow in excess of 10 gallons per hour.

Two types of electrical measurements are regularly made with the in-line measuring cell, viz., power factor and resistivity. The power factor of the dielectric fluid is often measured at 100 Hz., this measurement usually being obtained by means of a capacitance bridge connected across the electrode terminals. The other measurement, viz., resistivity, can be obtained by means of a megohm bridge. Power factor can be expressed as a percentage at 100 Hz. or 60 Hz. by applying a standard conversion equation. Resistivity is commonly expressed in ohm-centimeters. With a dielectric fluid such as chlorinated biphenyl, a typical resistivity reading at 0.045% 100 Hz. power factor is 14,000 ohm-centimeters. These and other electrical parameters can be continually monitored with a recording instrument.

The remarkable achievement of the present invention is quite unexpected in view of the lack of prior art success in obtaining acceptable in-line electrical readings, and in the substantial departure from prior art mechanical and electrical design principles. The beaker-type concentric electrode cell has remained the industry standard for electrical measurements of dielectric fluids because no suitable replacement has heretofore been discovered. Although a reliable in-line measuring cell has long been sought, those skilled in the art have heretofore been unable to produce a superior cell configuration. Previous attempts with in-line measuring cells have been beset with data accuracy and repeatability problems. Characteristic of prior art in-line cells has been the employment of counterflow fluid channeling, as opposed to the standard throughflow of the cell of this invention.

In the counterflow cell design of the prior art, the inner electrode features a hollow center with the lower end of the electrode being open. Incoming test fluid enters the open end of the inner electrode and fills the hollow body thereof. To reach the measuring zone between the concentric electrodes, the fluid must overflow the bottom end of the inner electrode wall. In so doing, the fluid twice changes direction. The counterflow-type cell of the prior art was designed with the intention of promoting stability and uniformity in the fluid flow as it approached the measuring zone. However, it was found that the directional changes associated with the counterflow action created turbulence in the vicinity of the sharp turns, resulting in fluid stagnation, localized air pockets, and aeration of the fluid itself. These air pockets within the fluid led to erroneous electrical readings.

The present invention, because of its electrode configuration and because of certain electrical shielding precautions, has surprisingly attained the desired accuracy level without adhering to the counterflow principle. By providing uniform distribution of fluid flow, coupled with sound electrical shielding, an accurate and efficient in-line cell capable of excellent data repeatability has been achieved. Any departure from the traditional counterflow principle was predicted to create untenable flow conditions for accurate electrical measurements. The present invention, however, by utilizing certain critical characteristics in the cell design, has adapted the through-flow principle for in-line measurement with outstanding results.

The embodiments of this invention in which an exclusive property or privilege is claimed are defined as follows:

1. A three-electrode in-line measuring cell comprising an open-ended outer electrode, a closed inner electrode disposed concentrically within said outer electrode with a clearance therebetween for passage of fluid, a guard electrode consisting of a pair of electrically conductive end flanges covering the ends of said outer electrode and insulated therefrom, said end flanges being connected by electrically conductive members, apertures in said end flanges for entry and discharge of fluid, and electrical termination means on each of said electrodes.

2. An in-line cell of claim 1 wherein the inner and outer electrodes are of cylindrical shape.

3. An in-line cell of claim 1 wherein the inner electrode has a convex surface on one end adapted to improve the flow characteristics of the incoming fluid.

4. An in-line cell of claim 1 wherein the end flanges are connected by electrically conductive through-bolts.

References Cited

UNITED STATES PATENTS

| | | | |
|---|---|---|---|
| 2,221,306 | 11/1940 | Christie | 324—30 |
| 2,599,583 | 6/1952 | Robinson et al. | (324—30B) |
| 2,623,928 | 12/1952 | Bower | (324—61P) |
| 2,934,700 | 4/1960 | Holaday et al. | (324—61LP) |
| 3,258,634 | 6/1966 | Rich | 324—32X |

EDWARD E. KUBASIEWICZ, Primary Examiner

U.S. Cl. X.R.

324—65